United States Patent [19]

Woods et al.

[11] 4,446,260

[45] May 1, 1984

[54] WATER DILUTABLE EPOXY COATING COMPOSITION

[75] Inventors: Richard A. Woods, Charlton; Rajesh R. Mehta, Forest Gate, both of England

[73] Assignee: International Paint Public Limited Company, London, England

[21] Appl. No.: 393,512

[22] Filed: Jun. 29, 1982

[30] Foreign Application Priority Data

Jul. 24, 1981 [GB] United Kingdom ................. 8122992
Oct. 16, 1981 [GB] United Kingdom ................. 8131231

[51] Int. Cl.³ ..................... C08G 59/50; C08G 59/68; C08G 59/02
[52] U.S. Cl. .................................... 523/409; 427/239; 427/372.2; 523/404; 523/412; 523/414
[58] Field of Search ............... 523/409, 412, 414, 417, 523/420, 404

[56] References Cited

U.S. PATENT DOCUMENTS

| | | | |
|---|---|---|---|
| 3,945,963 | 3/1976 | Levine et al. ........................ | 260/901 |
| 3,969,300 | 7/1976 | Nagata et al. ....................... | 427/386 |
| 4,021,396 | 5/1977 | Wu ..................................... | 526/312 |
| 4,177,179 | 12/1979 | Kurihara ............................. | 523/412 |
| 4,182,699 | 1/1980 | Fan ..................................... | 523/412 |
| 4,212,781 | 7/1980 | Evans et al. .......................... | 525/69 |
| 4,247,439 | 1/1981 | Matthews ............................ | 523/412 |
| 4,303,565 | 12/1981 | Tobias .............................. | 260/23 EP |

FOREIGN PATENT DOCUMENTS

| | | | |
|---|---|---|---|
| 6336 | 1/1980 | European Pat. Off. ............ | 523/412 |
| 6334 | 1/1980 | European Pat. Off. . | |
| 41108 | 12/1981 | European Pat. Off. . | |
| 3006175 | 8/1981 | Fed. Rep. of Germany ...... | 523/412 |
| 56-109243 | 8/1981 | Japan .................................. | 523/412 |
| WO81/01853 | 7/1981 | PCT Int'l Appl. . | |
| 2046767 | 11/1980 | United Kingdom . | |
| 2059968 | 4/1981 | United Kingdom . | |

*Primary Examiner*—C. A. Henderson
*Attorney, Agent, or Firm*—Steele, Gould & Fried

[57] ABSTRACT

A water dispersible coating composition is prepared by reacting together at elevated temperature in the presence of an amine 40 to 90% by weight of an epoxy resin composition of average epoxy functionality 1.0 to 2.0 epoxide groups per molecule and 10 to 60% by weight of a polymer containing carboxylic acid groups. The ratio of carboxylic acid groups to epoxide groups is 1.5:1 to 20:1. The reaction is carried out in a mixture of a water miscible organic solvent with 5 to 30% of water based on the combined weight of epoxy resin and polymer containing carboxylic acids groups. A coating composition in the form of a stable dispersion is produced by mixing the water dispersible coating composition prepared as described above with a base and sufficient water to form a predominantly aqueous continuous phase.

10 Claims, No Drawings

WATER DILUTABLE EPOXY COATING COMPOSITION

BACKGROUND OF THE INVENTION

1. Field of the Invention

This invention relates to a water dispersable coating composition based on an epoxy resin. Epoxy resins are capable of forming tough coatings which are highly resistant to hydrolysis and to chemical attack. Coatings exhibiting particularly high resistance to hydrolysis are for example required for internal coatings for food and beverage cans which may have to withstand heating in contact with acidic aqueous liquids such as fruit juice or beer. The coating should not hydrolyse to release any substances which might impair the flavour of the food or beverage and should adhere sufficiently strongly to the can, which is usually of tinplate or aluminium, to withstand the conditions imposed during pasteurization of the food or beverage.

It is, however, difficult to produce coating compositions containing epoxy resin in a water dispersable form. Coatings based on volatile organic solvents are being regarded with increasing disfavour as the evaporated solvent causes atmospheric pollution and the cost of organic solvent is rapidly increasing. The present invention seeks to prepare a coating composition based on an epoxy resin which can be applied to a substrate from a solution or stable dispersion in a diluent consisting mainly of water.

2. Description of Prior Art

European Patent Publications Nos. 6334 and 6336 describe a process for preparing a self-emulsifiable epoxy ester copolymer mixture which comprises esterifying a solvent-soluble carboxyl-functional polymer with an epoxy resin which is a mixture comprising aromatic polyethers containing oxirane functionality, at least 5% of the aromatic polyethers being constituted by diepoxide, the mixture of aromatic polyethers constituting at least 40% of the total resin solids content and providing oxirane functionality in a stoichiometric deficiency with respect to carboxyl functionality in the carboxyl-functional polymer of from 1:2 to 1:20, the esterification being carried out in organic solvent medium in the presence of more than 2% of an amine esterification catalyst, based on the weight of the reactants subjected to esterification, and at an elevated temperature sufficient to cause the oxirane functionality to react with the carboxyl functionality until the oxirane functionality is substantially entirely consumed, and reacting at least a portion of the carboxyl functionality in the resultant polymer-epoxy resin hydroxy ester reaction product with a base to render the reaction product self-emulsifiable in water. European Patent Publication No. 6334 teaches that to avoid gelation of the reaction mixture a high proportion of the amine esterification catalyst, such as 4-10% by weight based on the reactants, must be used. British Patent Publication No. 2,059,968 describes an alternative method for preparing a water dispersable coating composition in which an epoxy resin is reacted with a solution, in a mixture of water and an organic solvent, of a carboxyl-functional acrylic polymer and an amine. In this process also, a high proportion of amine is present during the reaction of the epoxy resin and the carboxyl-functional polymer. An alternative process for preparing a water dispersable coating composition based on an epoxy resin and an addition polymer containing carboxylic acid groups is described in U.S. Pat. No. 4,212,781. In this process the epoxy resin is reacted with addition polymerisable material at least part of which is carboxylic acid functional in the presence of 6-7% by weight of benzoyl peroxide catalyst. The present invention prepares a water dispersable coating composition from an epoxy resin without requiring the use of such high levels of catalyst.

SUMMARY OF THE INVENTION

A process according to the invention for preparing a water dispersable coating composition comprises reacting together at elevated temperature in the presence of an amine 40-90% by weight of an epoxy resin composition of average epoxy functionality 1.0 to 2.0 epoxide groups per molecule and 10-60% by weight of a polymer containing carboxylic acid groups, the ratio of carboxylic acid groups to epoxide groups being from 1.5:1 to 20:1 and the reaction being carried out in a mixture of a water miscible organic solvent with 5-30% of water based on the combined weight of epoxy resin and polymer containing carboxylic acid groups.

DESCRIPTION OF THE PREFERRED EMBODIMENTS

The epoxy resin preferably contains aromatic groups joined together by ether linkages and preferably has an average molecular weight of at least 1500, most preferably 2000-12000. Examples of suitable epoxy resins are condensed glycidyl ethers of bisphenols such as 2,2-bis(4-hydroxyphenyl) propane, known as bisphenol A. Such epoxy resins are sold under the Trade Marks 'Epikote 1007' (epoxy functionality about 1.4), 'Epikote 1009' (epoxy functionality about 1.2), 'Dow DER 668' 'Dow DER 667' and 'Dow DER 669'. Alternatively, suitable epoxy resins can be prepared from epoxy resins of lower molecular weight and having a functionality of about 2.0 such as Epikote 1001 by reaction with a bisphenol such as bisphenol A. Mixtures of epoxy resins can be used; for example, resins such as Epikote 1001 can be mixed with resins of higher molecular weight. Epoxy resins of higher functionality, for example an epoxy novolac resin, can be mixed with epoxy resins of low functionality such as Epikote 1009 to produce an epoxy resin mixture having an average functionality of 1.0 to 2.0 epoxide groups per molecule.

The polymer containing carboxylic acid groups is preferably an addition polymer of an olefinically unsaturated carboxylic acid for example acrylic acid, methacrylic acid, maleic acid, itaconic acid or citraconic acid. The olefinically unsaturated acid is preferably copolymerised with at least one olefinically unsaturated comonomer for example an acrylic ester such as methyl methacrylate, butyl acrylate, ethyl acrylate, propyl acrylate, propyl methacrylate, butyl methacrylate, hexyl methacrylate, 2-hydroxy-propyl methacrylate, 2-hydroxy-ethyl acrylate, 2-hydroxy-ethyl methacrylate or 2-hydroxy-propyl methacrylate, acrylamine methacrylate, styrene or alpha-methylstyrene. The copolymer preferably contains 10-85%, most preferably 30-60%, by weight of the unsaturated carboxylic acid units. The ratio of carboxylic acid groups in the polymer containing carboxylic acid groups to epoxide groups in the epoxy resin is preferably from 2:1 to 10:1. The polymer containing carboxylic acid groups is preferably prepared by free radical polymerisation in an organic solvent which is wholly or partly miscible in water, for example an ether alcohol such as 2-ethoxyethanol, 2-methoxyethanol or 2-butoxyethanol, an alcohol such as ethanol or butanol, and/or an ester such as ethyl acetate, butyl acetate or 2-ethoxyethyl acetate. A minor amount of an aromatic hydrocarbon such as xylene or toluene can be mixed with the water-miscible organic solvent and may help in avoiding gelation in the subsequent esterification reaction.

The reaction between the epoxy resin and the polymer containing carboxylic acid groups is catalysed by an amine, preferably a tertiary amine such as dimethylamino ethanol, diethylamino ethanol, triethylamine, triethanolamine, dimethyl benzylamine, N-ethyl morpholine or 2-(N,N-dimethylamino)-2-methyl propanol. The amount of amine present is preferably 0.5 to 3.0% based on the combined weight of the epoxy resin and polymer containing carboxylic acid groups, most preferably 1.0 to 2.0%. Higher proportions of amine can be used but we have found that if the reaction is carried out in the presence of 5–30%, preferably 5 to 20 or 25%, of water based on the combined weight of the epoxy resin and the polymer containing carboxylic acid groups such higher amounts of amine are unnecessary. If less than 5% by weight of water is present then a high proportion of amine is necessary to prevent gelation of the reaction mixture, and if more than 30% by weight of water is present increasing amounts of amine and organic solvent are necessary to achieve an economically desirable reaction rate.

The reaction between the polymer containing carboxylic acid groups and the epoxy resin is preferably carried out by mixing the epoxy resin, optionally together with additional organic solvent, into a solution of the carboxyl-containing polymer, for example an acrylic polymer prepared by solution polymerisation in a water miscible organic solvent as described above. The amine catalyst and water are preferably pre-mixed and then added to the dissolved resins. Alternatively the amine and water can be added to the solution of the carboxyl-containing polymer before it is mixed with the epoxy resin. The reaction is preferably carried out at a temperature in the range 80°–120° C.; conveniently it is carried out at reflux at a temperature of about 95°–100° C. The time of reaction should be sufficient to react substantially all the epoxy groups, for example a time of 2–8 hours. The acid value of the reaction product is preferably in the range 30–100.

The preferred carboxyl-containing polymers and the preferred epoxy resins may not form compatible solutions, so that the reaction mixture is inhomogenous at the start of the reaction, having the appearance of a cloudy dispersion. In some cases the reaction mixture tends to clear towards the end of the reaction to give a homogenous mixture.

When the reaction between the epoxy resin and the polymer containing carboxylic acid groups has been completed a base is generally added to the reaction product to neutralise at least partially the excess of free carboxylic acid groups. The base can for example be ammonia or an amine and is generally added to the reaction product in the form of an aqueous solution. Tertiary amines are preferred for example triethylamine, triethanolamine or dimethylamino ethanol. In a preferred procedure the base is added as a dilute solution in sufficient water to convert the coating composition to a stable dispersion having a predominantly aqueous continuous phase which can be further diluted with water without loss of dispersion stability. The amount of base used is preferably sufficient to neutralise 40–120% or 130% of the free carboxylic acid groups in the reaction product. The smooth white dispersion formed after addition of base and water can be used directly as a coating composition or can be further diluted with water to the required viscosity. If desired the organic solvent used in the preparation of the coating composition can be wholly or partly removed from the composition and recovered. For example, butanol, ethyl acetate and/or xylene can be removed from the coating composition by azeotropic distillation.

The coating composition of the invention is particularly suitable for coating the inside surface of food and beverage cans, including cans for fruit juice or beer. The coatings have excellent adhesion to metals such as tinplate, steel and aluminium and to polymers used as base coats for food and beverage cans, and successive coats of the coating composition of the invention adhere well to each other. The coating composition can if desired contain an aminoplast or phenolic resin to give additional cross linking of the coating on curing although this is not generally necessary. The aminoplast resin can be added to the coating composition before or after the steps of neutralisation and dilution. Examples of suitable aminoplast resins are melamine formaldehyde resins particularly those consisting mainly of hexamethoxy methyl melamine. The coating composition is preferably applied to the substrate as a spray but can also be applied by dip coating, anionic electrocoating, direct or reverse roller coating, flow coating or rinse coating. The coating is preferably heated at 100° C. to 240° C. for 10 seconds to 20 minutes to effect curing, temperatures of 150° C. to 210° C. being preferred.

The invention is illustrated by the following Examples:

EXAMPLE 1

An acrylic prepolymer solution is prepared as follows:

| ITEM | DESCRIPTION | PARTS BY WEIGHT |
|---|---|---|
| 1 | n-Butanol | 400 |
| 2 | Ethylene glycol monobutyl ether | 240 |
| 3 | Methacrylic acid monomer | 185 |
| 4 | Styrene monomer | 80 |
| 5 | Ethyl acrylate monomer | 210 |
| 6 | Benzoyl peroxide | 15 |
| 7 | n-Butanol | 200 |
| | | 1330 |

Items 1 and 2 are charged to a reactor equipped with stirrer, reflux condenser, monomer tanks and flow regulator, thermometer and addition funnel. This solvent mixture is heated to 120° C. and the premixed monomers (3–5), solvent (7) and peroxide (6) are added over two hours. The batch temperature is maintained at 120° C. for the duration of the monomer addition and for a further two hours after which time the batch is cooled to room temperature. The resultant acrylic solution polymer has a solid content of 36%, and an acid value of 254 mg. KOH/gm. (based on solids).

The epoxy/acrylate polymer dispersion is prepared as follows:

| ITEM | DESCRIPTION | PARTS BY WEIGHT |
|---|---|---|
| 1 | Acrylic pre-polymer solution | 1328 |

| ITEM | DESCRIPTION | PARTS BY WEIGHT |
|---|---|---|
|  | -continued |  |
|  | (prepared as above) |  |
| 2 | Epoxy resin (Bisphenol A type of epoxy equivalent weight about 3000) (Epikote 1009) | 1120 |
| 3 | Dimethylamino ethanol | 29 |
| 4 | Demineralised water | 200 |
| 5 | Dimethylamino ethanol | 92 |
| 6 | Demineralised water | 3650 |
|  |  | 6419 |

Item 1 is charged to the reactor, equipped with stirrer, reflux condenser, thermometer and addition funnel. The acrylic pre-polymer solution is heated to 110° C. and the epoxy resin dissolved in this solution. When all the epoxy resin has dissolved the reaction mixture is cooled to 90° C. and, premixed, water and amine (items 3 and 4) are added. The mixture is then processed at reflux until the reaction is complete (generally about 4 hours) and the polymer has an acid value of 63 mg. KOH/g.

The remaining dimethylamino ethanol and demineralised water (items 5 and 6) are premixed and heated to 70° C. in a stainless steel vessel suitable for carrying out the dispersion of the ester grafted epoxy/acrylic polymer.

Once the esterification stage, described above, has been completed the polymer is discharged into the water and amine mixture. The dispersion is cooled to room temperature and filtered ready for use. The dispersion has a 25% solids content; a viscosity of 25–35 seconds Ford Cup No. 4 at 25° C. and a water solvent ratio of 80/20.

EXAMPLE 2

An acrylic prepolymer solution is prepared as follows:

| ITEM | DESCRIPTION | PARTS BY WEIGHT |
|---|---|---|
| 1 | n-Butanol | 1000 |
| 2 | Methacrylic acid | 226 |
| 3 | Styrene | 47 |
| 4 | Ethyl acrylate | 41 |
| 5 | Benzoyl peroxide | 9 |
| 6 | n-Butanol | 247 |
|  |  | 1570 |

The butanol (item 1) is charged to a reactor equipped with stirrer, reflux condenser, monomer tanks and flow regulator, thermometer and addition funnel and heated to reflux. The monomers and peroxide (items 2–5) are premixed in the monomer tank and added to the reactor over two hours. The batch temperature is maintained at reflux for the duration of the monomer addition and for a further two hours after which the batch is cooled and adjusted to 20% solids with butanol (item 6). This acrylic polymer has an acid value of 469.5 mg. KOH/gm.

The epoxy/acrylate polymer dispersion is prepared as follows:

| ITEM | DESCRIPTION | PARTS BY WEIGHT |
|---|---|---|
| 1 | Acrylic pre-polymer solution (prepared as above) | 1607 |
| 2 | n-Butanol | 703 |
|  | -continued |  |
| 3 | Ethylene glycol butyl ether | 413 |
| 4 | Epoxy resin (Bisphenol A type of epoxy equivalent weight about 2000) (Epikote 1007) | 1281 |
| 5 | Dimethylamino ethanol | 29 |
| 6 | Demineralised water | 200 |
| 7 | Dimethylamino ethanol | 87 |
| 8 | Demineralised water | 4611 |
|  |  | 8930 |

The acrylic pre-polymer, butanol and ethylene glycol monobutyl ether (items 1–3) are charged to a reactor equipped with stirrer, reflux condenser, thermometer and addition funnel. The mixture is heated to 110° C. and the epoxy resin dissolved in this mixture. When all the epoxy resin has dissolved the mixture is cooled to 90° C. and the premixed water and amine (items 5 and 6) added. The reaction mixture is then heated to reflux until the reaction is complete (generally about 4 hours) so that there is produced a polymer having an acid value of 70 mg. KOH/g. When this acid value has been attained the remainder of the dimethylamino ethanol (7) and part of the demineralised water (8) are premixed and added to the polymer solution followed immediately by the remainder of the demineralised water. This gives a dispersion at 18% solids content with a 66/34:water solvent ratio. This may be adjusted to the desired solids content and water/solvent ratio by removing excess solvent by distillation.

What is claimed is:

1. A process for preparing a water dispersible coating composition comprising:
    (A) reacting together at elevated temperature (a) 40–90 percent by weight of an epoxy resin composition of average epoxy functionality 1.0 to 2.0 epoxide groups per molecule and average molecular weight 2000 to 12,000 and (b) 10–60 percent by weight of a polymer containing carboxylic acid groups which is an addition copolymer of 10–85 percent by weight of an olefinically unsaturated carboxylic acid and 90–15 percent by weight of at least one olefinically unsaturated comonomer, the ratio of carboxylic acid groups in (b) to epoxide groups in (a) being from 1.5:1 to 20:1, and
    (B) carrying out said reaction in the presence of 0.5 to 3.0 percent by weight of an amine in a mixture of a water miscible organic solvent with 5 to 30 percent by weight of water, the percentages of amine and of water being based on the combined weight of epoxy resin (a) and copolymer (b).

2. A process according to claim 1, wherein said reaction is carried out in a mixture of a water miscible organic solvent with 5 to 20% of water, based on the combined weight of epoxy resin (a) and copolymer (b).

3. A process according to claim 1 or claim 2, wherein the amount of amine present during the reaction is 1.0 to 2.0% based on the combined weight of the epoxy resin (a) and copolymer (b).

4. A process according to claim 1, wherein the amine is a tertiary amine.

5. A process according to claim 1, wherein the epoxy resin (a) contains aromatic groups joined together by ether linkages.

6. A process according to claim 1, wherein the ratio of carboxylic acid groups in the polymer containing carboxylic acid groups to epoxide groups in the epoxy resin is 2:1 to 10:1.

7. A process according to claim 1, further comprising:
(C) mixing the water dispersible coating composition produced by (A) and (B) with a base and sufficient water to form a predominantly aqueous continuous phase, whereby a stable dispersion is formed.

8. A process according to claim 7, wherein said base is a tertiary amine.

9. A process according to claim 7 or claim 8, wherein the amount of base used is sufficient to neutralize 40 to 130% of the free carboxylic acid groups in the reaction product of the epoxy resin composition and the polymer containing carboxylic acid groups.

10. A process according to claim 7, further comprising:
(D) at least partially removing said organic solvent used in the preparation of the coating composition from the composition.

* * * * *